Jan. 8, 1963   L. W. KINGS   3,071,943
UNIVERSAL JOINTS
Filed Feb. 13, 1961   2 Sheets-Sheet 1
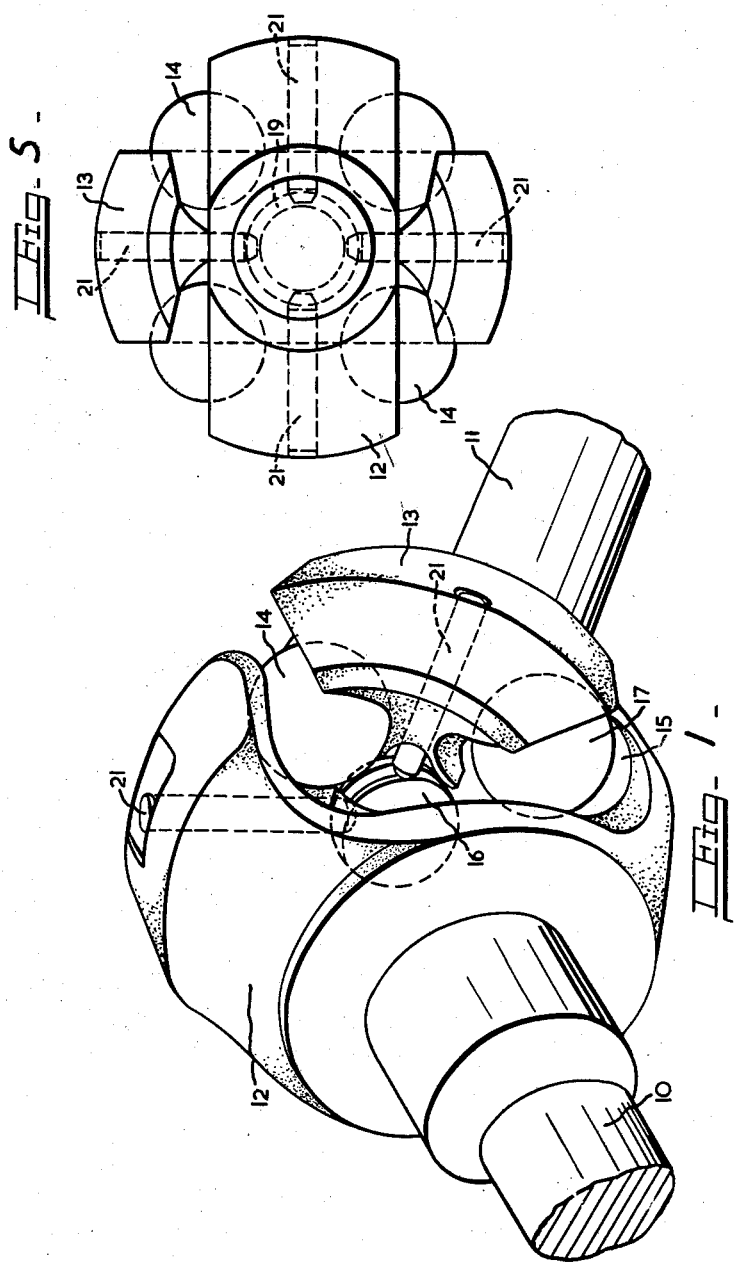
LEONARD W. KINGS
BY: Scrivener & Parker

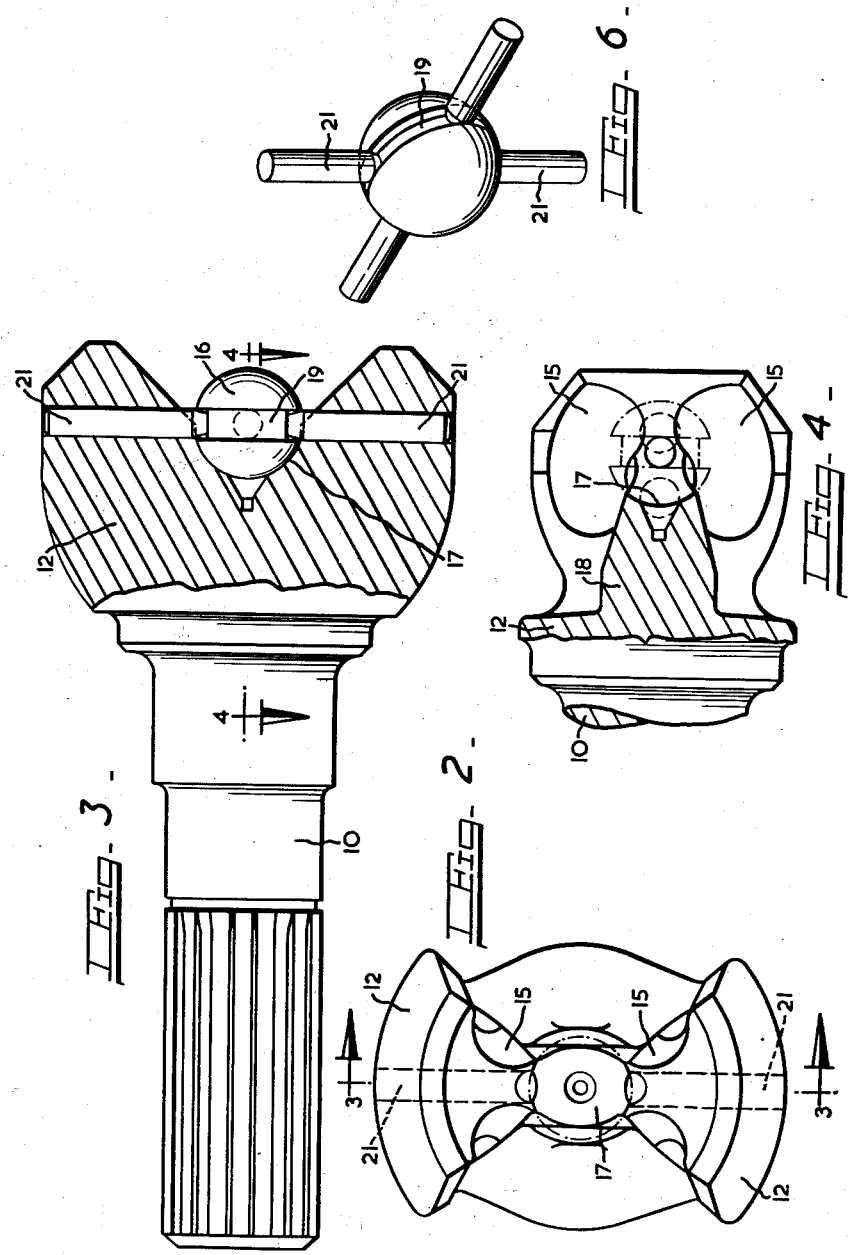

3,071,943
UNIVERSAL JOINTS
Leonard William Kings, Leamington Spa, England, assignor to Girling Limited, Birmingham, England, a British company
Filed Feb. 13, 1961, Ser. No. 88,802
Claims priority, application Great Britain Feb. 20, 1960
2 Claims. (Cl. 64—21)

This invention relates to improvements in universal joints for the transmission of power between two shafts of which the alignment may vary, and refers more particularly to universal joints of the constant velocity type. Most universal joints of this type incorporate a floating member or members through which motion is transmitted between the main members of the joint, and one of the difficulties is to prevent separation of the component parts of the joint through relative axial movement and to keep the joint as a unit when it can be handled without separation of the components before it is fitted.

When the joint is fitted, it may be subjected to forces tending to pull it apart, and it is common practice to provide in one of the shafts a sliding splined or like coupling. Friction in the coupling can lead to considerable axial forces being applied when there is relative axial movement between the two parts of the coupling. When such movement is oscillatory, as it is in a front wheel drive in a vehicle, these forces lead to noisy operation and heavy wear, and if the axial movement is considerable the component parts of the universal joint may separate.

One method of overcoming this difficulty is to provide one of the members of the universal joint wth a spherical outer surface working in a cup-shaped member attached to the other member of the joint to prevent separation of the joint, but this method and other methods used for this purpose are expensive to produce and difficult to assemble.

The problem is particularly difficult in universal joints of the "Weiss" type, in which balls roll between forks. Known methods of securing the two main members of the joint together make it difficult to load the balls, and unless the main members are effectively secured together, the balls can escape and be lost.

According to our invention, in a constant velocity universal joint, the two main or input and output members of the joint are coupled together by means located within the joint and adapted to prevent appreciable relative movement between the members in an axial direction without interfering with the constant velocity properties of the joint.

In a universal joint of the Weiss type, comprising co-operating forks with balls adapted to roll in curved grooves in the forks, the coupling means is conveniently formed by a spherical member located at the centre of the joint and engaged by parts extending inwardly from the forks.

Preferably the parts carried by the forks and engaging with the spherical member are pairs of opposed pins located in radial drillings in the limbs of the forks, the inner ends of the pins being slidably engaged in a circumferential groove in the spherical member which lies in a plane at right angles to the axis of the joint.

A practical application of our invention to a universal joint of the Weiss type is illustrated by way of example in the accompanying drawings in which:

FIGURE 1 is a perspective view of a joint showing the two members with their axes at a substantial inclination to each other;

FIGURE 2 is a side elevation of one member of the joint from the inner end;

FIGURE 3 is a side elevation of one member of the joint partly in section on the line 3—3 of FIGURE 2;

FIGURE 4 is a fragmentary section on the line 4—4 of FIGURE 3;

FIGURE 5 is an end view of the complete joint; and

FIGURE 6 is a perspective view of the locating ball and pins alone.

FIGURES 1 to 6 show a universal joint of the well-known Weiss type in which two shafts 10 and 11 adapted to be drivably coupled by the joint carry forks 12, 13 forming the input and output members of the joint. The drive is conveyed through balls 14 rolling in co-operating curved grooves 15 in the inner faces of the forks.

According to the form of our invention shown in these figures, a ball 16 is located at the geometrical centre of the joint and is received in complementary part-spherical recesses or seatings 17 in the inner ends of central webs 18 extending transversely between the limbs of the forks. The ball has a peripheral groove 19 in a plane at right angles to the axis of the joint and pairs of opposed pins 21 are mounted in radial drillings in the forks with the inner ends of the pins engaging slidably in the groove 19 in the ball. When the axes of the shafts 10 and 11 are in alignment the axes of all four pins lie in a common plane at right angles to the axes of the shafts and containing the centre of the ball. The pins can move circumferentially in the groove in the ball 16 and do not interfere with the normal operation of the joint, but they effectively prevent relative axial movement between the input and output members.

The pins may be a drive fit in the drillings in the forks, or they may be a sliding fit in the drillings in which they are secured against axial movement by set-screws or the like which can be readily removed when it is desired to dismantle the joint.

I claim:

1. A constant velocity universal joint comprising co-operating forks each including spaced limbs, curved grooves in said limbs, balls adapted to roll in said grooves for drivably coupling the forks, a spherical member located at the centre of articulation of the joint, an annular groove in said spherical member lying in a plane at right angles to the axis of the joint, and pairs of opopsed radial pins located in the limbs of the forks, the inner ends of the pins engaging slidably in said groove.

2. A constant velocity universal joint as in claim 1 wherein said spherical member is located between complementary part-spherical surfaces on the inner ends of webs extending transversely between the limbs of said forks.

References Cited in the file of this patent

UNITED STATES PATENTS 2,217,969    Schairer _____ Oct. 15, 1940